(12) United States Patent
Kapteijn

(10) Patent No.: US 12,497,135 B2
(45) Date of Patent: Dec. 16, 2025

(54) BELT AND METHOD FOR REDUCING THE DRAG OF A HULL OF A FLOATING VESSEL

(71) Applicant: ALFA LAVAL ROTTERDAM B.V., Rotterdam (NL)

(72) Inventor: Pieter Karel Anton Kapteijn, Hilversum (NL)

(73) Assignee: ALFA LAVAL ROTTERDAM B.V., Rotterdam (NL)

(*) Notice: Subject to any disclaimer, the term of this patent is extended or adjusted under 35 U.S.C. 154(b) by 595 days.

(21) Appl. No.: 17/918,798

(22) PCT Filed: Apr. 19, 2021

(86) PCT No.: PCT/EP2021/060042
§ 371 (c)(1),
(2) Date: Oct. 13, 2022

(87) PCT Pub. No.: WO2021/209639
PCT Pub. Date: Oct. 21, 2021

(65) Prior Publication Data
US 2023/0147120 A1 May 11, 2023

(30) Foreign Application Priority Data
Apr. 17, 2020 (EP) .................................. 20170189

(51) Int. Cl.
*B63B 1/38* (2006.01)
(52) U.S. Cl.
CPC .......... *B63B 1/38* (2013.01); *B63B 2001/387* (2013.01)

(58) Field of Classification Search
CPC ...... B63B 1/38; B63B 2001/387; Y02T 70/10
See application file for complete search history.

(56) References Cited

U.S. PATENT DOCUMENTS

| 6,145,459 A | 11/2000 | Takahashi et al. |
| 7,080,664 B1 | 7/2006 | Ayer |
| 2011/0214762 A1 | 9/2011 | Sanderson et al. |

(Continued)

FOREIGN PATENT DOCUMENTS

| CN | 108177725 A | 6/2018 |
| JP | 11-59562 A | 3/1999 |
| JP | 2013-529570 A | 7/2013 |

(Continued)

OTHER PUBLICATIONS

International Search Report for PCT/EP2021/060042, Prepared by the European Patent Office, Mailing date Jul. 5, 2021, 4 pages.

(Continued)

*Primary Examiner* — Anthony D Wiest
(74) *Attorney, Agent, or Firm* — Birch, Stewart, Kolasch & Birch, LLP

(57) ABSTRACT

A belt for reducing the drag of a hull of a floating vessel, whereby the belt includes a belt body extending in a length direction (L), whereby the belt has, a sequence of bubble generators which are embedded in the belt body, whereby the belt has an air channel for supplying pressurized air to the bubble generators, whereby the air channel extends in the length direction (L), whereby the bubble generators are connected to the air channel, whereby the belt body is made of a flexible material. Also disclosed is a device having such a belt and a method of reducing the drag of a hull of a floating vessel using such a belt.

17 Claims, 4 Drawing Sheets

(56) References Cited

U.S. PATENT DOCUMENTS

2011/0259257 A1 10/2011 Costas
2013/0269589 A1 10/2013 Kapteijn

FOREIGN PATENT DOCUMENTS

| KR | 101802231 B1 | 11/2017 |
|---|---|---|
| WO | WO 88/07956 A1 | 10/1988 |
| WO | 2005122676 A2 | 12/2005 |
| WO | WO 2011/161187 A1 | 12/2011 |

OTHER PUBLICATIONS

English translation of the Japanese Office Action for Japanese Application No. 2022-562755, dated Mar. 25, 2024.
English translation of the Chinese Office Action and Chinese Application No. 202180043500.1, dated Oct. 21, 2024.

BELT AND METHOD FOR REDUCING THE DRAG OF A HULL OF A FLOATING VESSEL

CROSS-REFERENCE TO RELATED APPLICATION

This application is the U.S. national phase of PCT Application No. PCT/EP2021/060042 filed on Apr. 19, 2021, which claims priority to EP patent application No. 20170189.3 filed on Apr. 17, 2020, the disclosures of which are incorporated in their entirety by reference herein.

The present invention concerns a belt and a method for reducing the drag of a hull of a floating vessel.

It is known that the drag, in other words the frictional resistance, of the hull of a floating vessel, like a barge or a ship, when moving through water, can be reduced by employing air bubbles at the interface between the hull and the water. This is also called air lubrication. WO2011/161187 discloses an apparatus for doing this.

For installation of such an apparatus, the hull needs to be modified in that the apparatus needs to be firmly and permanently attached to the hull. Installation of such an apparatus can therefore only be done when the vessel is in dry dock.

For vessels such as drilling rigs and floating storage and production units that only occasionally make long journeys towed by a tug, it is impractical and not cost effective to install the known apparatus.

There is therefore a need for an apparatus to generate air bubbles on a hull, which is easy to install, and which can be easily removed without damage.

The invention aims to solve these problems and therefore provides for a belt for reducing the drag of a hull of a floating vessel, whereby the belt comprises a belt body extending in a length direction, whereby the belt comprises, in the length direction, a sequence of bubble generators which are embedded in the belt body, whereby the belt comprises an air channel for supplying pressurised air to the bubble generators, whereby the air channel extends in the length direction, whereby the bubble generators are connected to the air channel, whereby the belt body is made of an elastic and flexible material.

Such a belt can easily be placed around part of the hull, in particular the underside, and possibly also the sides, of the hull, and then tensioned to be kept in place. Due to its flexibility it will thereby follow the shape of the hull and sit tightly against the hull.

After use, such a belt can also be removed again by releasing the tension and then be reused on another vessel.

Such a belt is therefore particularly suited to equip a vessel with air lubrication possibilities if a practical opportunity, i.e. a major maintenance, to install a permanent air lubrication system is not available, or if the vessel is mainly used in a single location and only occasionally needs to be moved to another, far away location.

KR20170000711 discloses a belt including a separated air injection pipe comprising an air provider to produce and provide air; an air providing pipe into which the air discharged from the air provider flows; and a separated air injection pipe, which has a plurality of air injection holes formed on one side thereof. WO2005/122676 discloses a bubble-generating device consisting of a multi-cell system which is affixed to the walls of the hull of the boat and which is equipped with at least one main circulation shaft which is traversed by a first conduit for pressurised water and a second conduit for a pressurised gas, said two conduits supplying multiple bubble-releasing cells. US2011/259257 discloses an apparatus for reducing the drag that a vessel hull experiences when moving through the water by interposing air bubbles between the hull and the stream of water that the vessel is moving through by delivering compressed air to the bottom of the vessel. US2011/214762 discloses A flow tube for a bidirectional flow meter comprising a first means for generating a periodic pressure fluctuation whose frequency varies in dependence on the flow rate of fluid through the meter in a first direction; and a second means for generating a periodic pressure fluctuation whose frequency varies in dependence on the flow rate of fluid through the meter in a second direction, opposite to the first direction; wherein said first and second generating means are connected in series between an inlet port and an outlet port. U.S. Pat. No. 7,080,664 discloses a fluid amplifier comprising at least one control valve having a movable element for selectively opening and closing at least one of a first control stream channel and a second control fluid flow channel, wherein the control valve also includes a diaphragm for isolating the moveable element.

In a preferred embodiment the air channel is fully enclosed in the belt body, so that it cannot easily get damaged. Preferably the air channel is formed as a channel-shaped cavity in the material of the belt body.

In a preferred embodiment the belt comprises at least one tensioning cable for tensioning the belt around a hull of a floating vessel, whereby preferably the tensioning cable is fully embedded in the belt body to avoid damage.

Such a tensioning cable allows large tensioning forces to be applied, so that the belt remains well in place during use.

In a preferred embodiment, the belt comprises magnets which are embedded in the belt body, whereby the magnets are magnets for attaching the belt to a metallic hull of a floating vessel.

Such magnets can be used as a fastening mechanism, alternatively to tensioning, but preferably in addition to tensioning, whereby the magnets are particularly useful for attaching the belt to the hull during installation and positioning it, before tension is applied.

In a preferred embodiment the bubble generators are fluidic oscillators for generating one or more pulsating air flows from a constant air flow. These allow control over the bubble size and bubble spacing, so that coalescence of bubbles can be reduced.

The invention further concerns a device for reducing the drag of a hull of a floating vessel, comprising a belt according to any of the previous claims and a tensioning device for tensioning the belt at least partly around the hull of a floating vessel.

Preferably, the device comprises a tension monitoring system capable of generating an status signal indicating a tension subceeding a first desired critical tension and/or exceeding a second critical tension. Hereby the range between the first critical tension and the second critical tension is a desired range for the tension, allowing normal use of the belt.

Such a status signal may be any type of signal, for instance electronic, radio, visual or audible. It may be set to be triggered at a first or second critical tension which is such that the tension needs to be checked and/or adjusted be personnel. In this case it is a warning signal that the tension needs to be checked. It may also be set to be triggered when subceeding a first critical tension at which attachment of the belt to the hull is no longer guaranteed. In this case it acts as an alarm signal to indicates a loss of sufficient tension, which is undesirable as it may result in the belt becoming detached from the hull. It may also be set to be triggered at a when exceeding a second critical tension which is an indication that the belt has snagged behind an obstacle. In this case it also acts as an alarm signal.

In a preferred embodiment, the device comprises a source of pressurised air which is connected to the air channel, whereby the tension monitoring system is connected to the source of pressurised air, whereby the the device is arranged such that an occurrence of said status signal causes the source of pressurised air to cease provision of pressurised air.

This is a further safety feature to avoid continued operation of an insufficiently tensioned belt.

The invention further concerns a method of reducing the drag of a hull of a floating vessel using a belt or a device according to the invention, whereby the belt is installed under the hull, whereby pressurised air is supplied to the air channel.

In a preferred variant of the method, the belt comprises magnets which are embedded in the belt body, whereby the belt, in a non-tensioned state, is first attached to the hull by means of the magnets, whereby afterwards the belt is tensioned against the hull, whereby during use of the belt tension is maintained.

This is an easy installation method of such a belt, because it can be first properly positioned, before tension is applied.

In a preferred variant of the method, it is a method of temporarily reducing said drag, whereby said belt is removed after being used to reduce said drag, and preferably rolled up for storage and/or used on another vessel.

In a preferred variant of the method, whereby the vessel is a vessel which is being towed by another vessel.

In the last two variants, the methods is focused on equipping vessels which are only occasionally making long voyages, eg international voyages across oceans, and which may not even have sufficient on board propulsion capabilities for such long voyages, with an air lubrication system.

In order to illustrate the invention, exemplary embodiments are explained below, with reference to the following figures, wherein.

Figure 1:
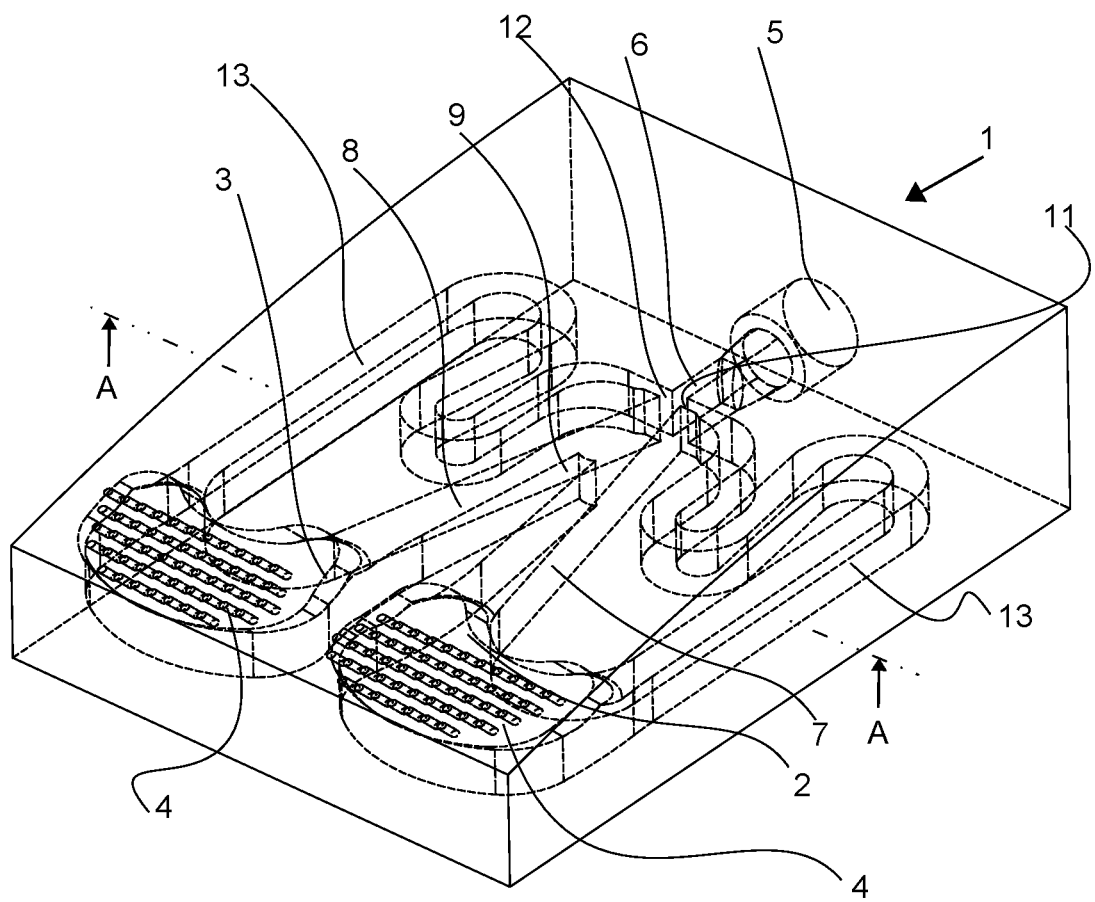
FIG. 1 shows a perspective view of a component of a belt and a device according to the invention.
Figure 2:
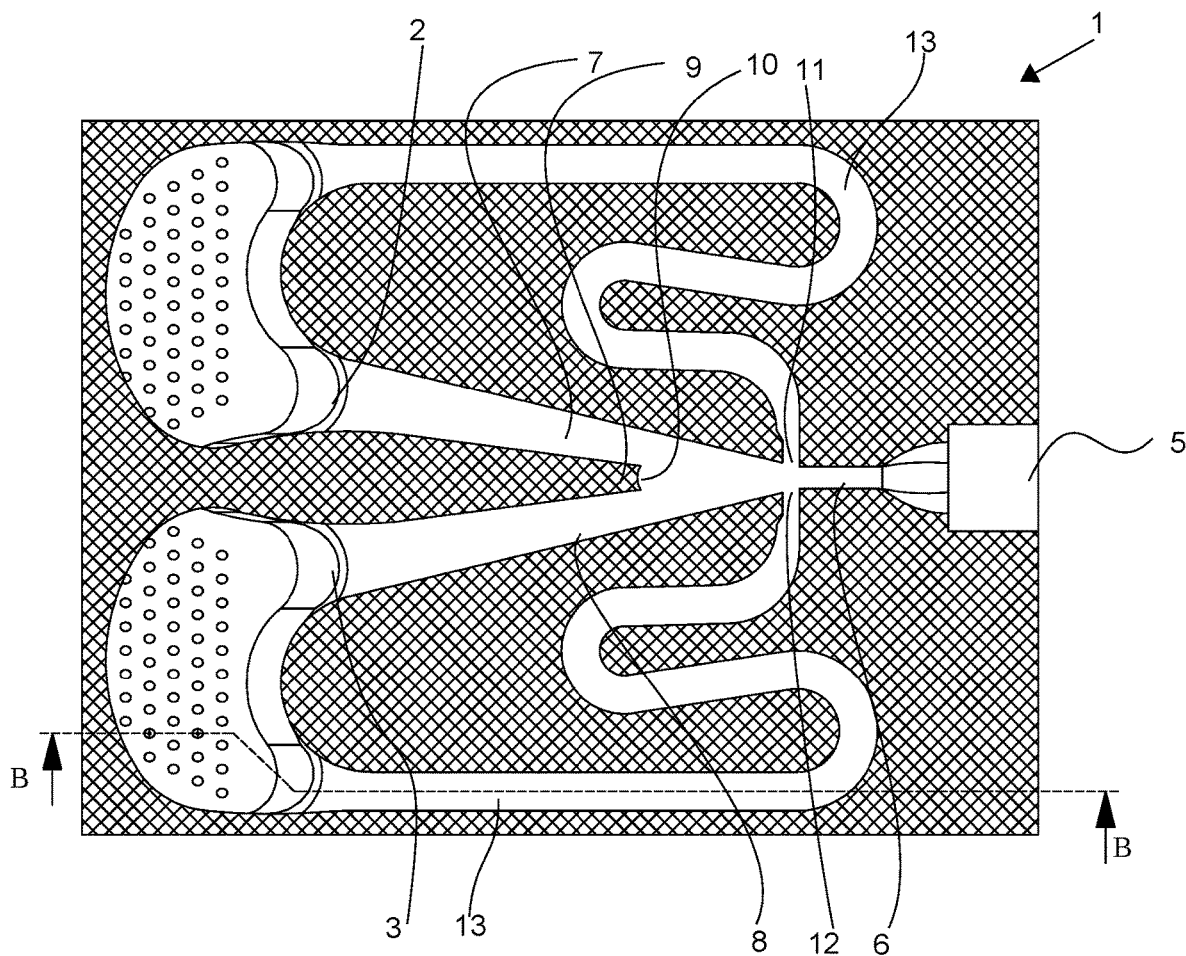
FIG. 2 shows a cross-section of the component of FIG. 1 according to line A-A.
Figure 3:
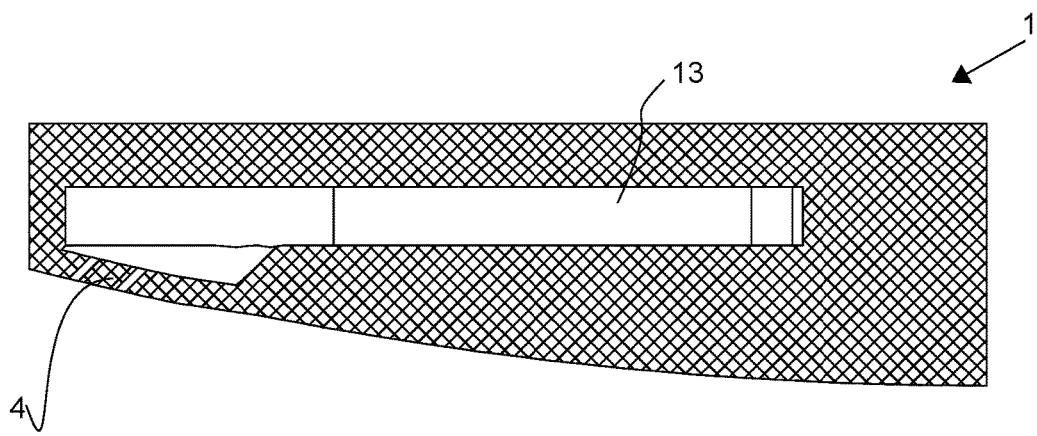
FIG. 3 shows a cross-section of the component of FIGS. 1 and 2 according to line B-B.

The oscillator 1 of FIGS. 1 to 3 is a traditional fluidic oscillator, of which the air outlets 2,3 are provided with perforated plates 4 with fifty round holes of 1.7 mm diameter each.

The oscillator 1 comprises a air inlet 5 and an air inlet channel 6 leading away from the air inlet 5. The air inlet channel 6 widens and diverges into two air outlet channels, more specifically a first outlet channel 7 and a second outlet channel 8 which lead to the two aforementioned air outlets 2,3, more specifically to a first air outlet 2 and to a second air outlet 3, which are provided with said perforated plates 4.

The two outlet channels 7, 8 are separated by a splitter 9 with a concave nose 10.

The splitter 9 and the air inlet channel 6 and the outlet channels 7, 8 jointly constitute a bistable fluidic amplifier arranged to amplify control signals, whereby in this case the control signals are fed to the fluidic amplifier via a first control port 11 and a second control port 12.

From each of the air outlets 2,3, a feedback channel 13 leads back to the control ports at the point where the air inlet channel 6 widens.

The oscillator 1 works as follows: A constant airflow is established at the air inlet 5 and through the air inlet channel 6. This airflow will either flow through the first outlet channel 7 or through the second outlet channel 8, but not through both at the same time. If undisturbed, the air will continue to flow this way because of the Coanda-effect, which enhances the tendency for a fluid to follow a curved surface. The transition from the air inlet channel 6 to each of the outlet channels 7, 8 is such a curved surface. The concave nose 10 of the splitter 9 helps to create an induced secondary airflow that further stabilises the airflow through that particular outlet channel 7,8.

Most of the air flowing through this outlet channel 7,8 will then exit at the corresponding air outlet 2,3. However, this airflow also generates a pressure pulse which is sent back via the corresponding feedback channel 13 to the corresponding control port 11, 12, and which cause the airflow to switch to the other outlet channel 7,8.

If left undisturbed, a stable airflow through the other outlet channel 7, 8 will now be established. However, also at the other air outlet 2,3, a pressure wave is generated, which will be fed back via the feedback channel 13 to the corresponding control port 11,12, so that the airflow switches to the other outlet channel 7,8 again.

This way, a sequence of pressure control signals, in other words a pressure control wave, is established at both control ports 11, 12, every time switching the airflow from the first outlet channel 7 to the second outlet channel 8 and back, thereby generating two pulsating airflows, one in each of the outlet channels 7, 8, each pulsating with the same oscillation frequency and phase shifted by half a wave period.

These sequences of control signals are thereby amplified by the fluidic amplifier The oscillation frequency of the oscillator 1 is more or less fixed, depending on the exact design of the oscillator 1. A change in air pressure at the air inlet 5, resulting in a change in the total air flow rate through the oscillator 1, will influence the oscillation frequency to a relatively small degree, but the oscillation frequency cannot be controlled independently of the air flow rate.

Figure 4:
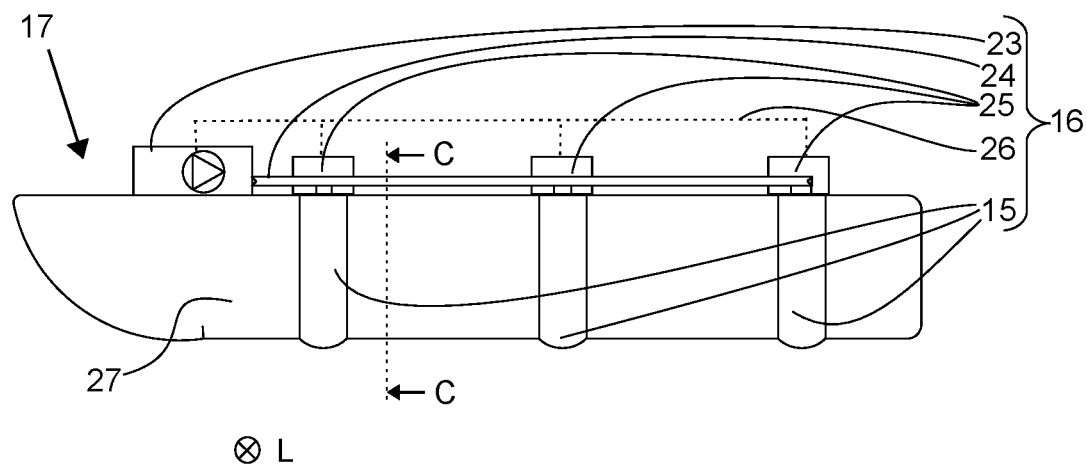
FIG. 4 shows side view of a vessel using belts and a device according to the invention.
Figure 5:
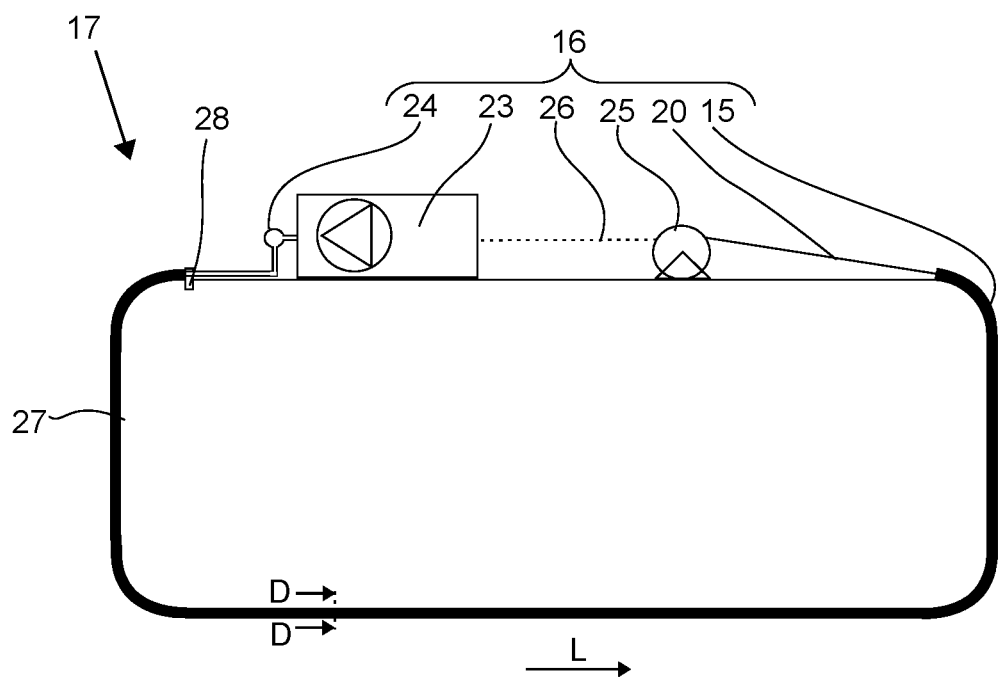
FIG. 5 shows a cross section according to line C-C of the vessel of FIG. 4.
Figure 6:
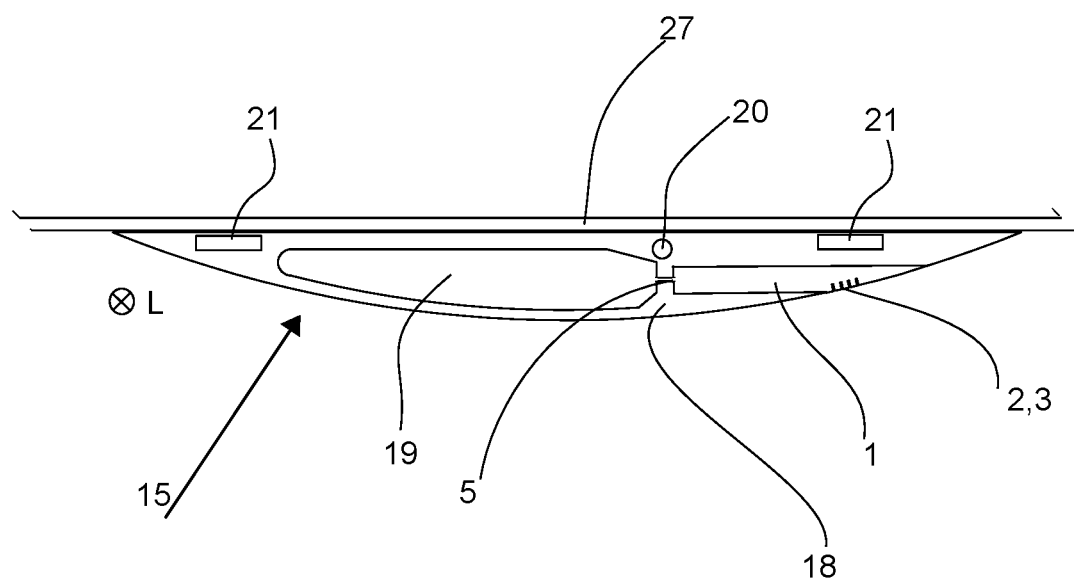
FIG. 6 shows a cross section according to line D-D of the vessel of FIG. 5.

This oscillator 1 can be advantageously used in a belt 15 and a device 16 according to the invention. This is illustrated in FIGS. 4 to 6.

These figures show a vessel 17 which is usually not provided with means for reducing drag, but which is in this case temporarily provided with a device 16 15 according to the invention. The vessel 17 is intended to be towed by a tug.

The device 16 comprises three flexible belts 15 which are attached around the vessel 17.

The belt 15 comprises a belt body 18 made of flexible rubber. The belt body 18 extends in a length direction L. In the belt body 18 a cavity is provided which acts as an air channel 19 and which extends over the entire length of the belt body 18.

The belt 15 further comprises fluidic oscillators 1, which are provided inside the belt body 18 at regular distances from each other, typically between two and forty oscillators 1 per meter length of the belt body 18. The air inlet 5 of each of these oscillators 1 is connected to the air channel 19, and the air outlets 2,3 of these oscillators 1 are placed on the outer surface of the belt body 18, so that they can release air freely.

The belt 15 further comprises a steel tensioning cable 20, which is provided in the belt body 18 and which extends over the entire length of the belt body 18, and which protrudes outside the belt body 18 at its extremes.

The belt 15 further comprises strong, industrial magnets 21, which are integrated in the belt body 18.

The device 16 further comprises a compressor 23 and connecting pipes 24 for connecting the air channels 19 in the belt bodies 18 to the compressor 23. The device 16 further comprises three tensioning devices 25 for tensioning the belts 15. The tensioning devices 25 are each equipped with a tension monitoring capability. The device 16 is provided with a data cable 26 between the tensioning devices 25 and the compressor 23.

This installation and use of the device 16 is as follows.

Firstly the belts 15 are placed under and partly around the hull 27 of the vessel 17. At this point, the magnets 21 temporarily secure the belts 15 to the hull 27. At this stage the belts 15 can be easily detached and placed somewhere else, so that they can be easily placed at intended positions.

The tensioning cables 20 are then connected on deck to anchoring points 28 at one extreme of the belts 15 and to the tensioning devices 25 at the other extreme of the belts 15, and tensioned to be fixed securely in place. The belts 15 will bend to follow the contours of the hull 27.

Compressed air is then supplied by the compressor 23 to the air channels 19. This compressed air is then distributed in the air channels 19 to the air inlets 5 of the oscillators 1, so that the oscillators 1 start to release a stream of bubbles from their air outlets 2,3.

This provides air lubrication between the hull 27 of the vessel 17 and the surrounding water, so that a reduction in drag is obtained.

Obviously it is very undesirable if insufficient tension is applied to the tensioning cables 20, because the belts 15 may then come loose while the vessel 17 is moving through the water. Also, a loss of tension may indicate that a belt 15 is broken or no longer anchored to the deck.

Obviously it is also very undesirable if the tension is too high, as the belt 15 may break.

Therefore, the tensioning devices 25 monitor the tension continuously and send an alarm signal via the data cable 26 to the compressor 23 and to the staff of the vessel 17 or the tug if insufficient or too much tension is present, so that the staff may investigate and remedy this situation.

The compressor 23 is arranged to shut off as a safety measure if an alarm signal is detected.

The invention claimed is:

1. A belt for reducing a drag of a hull of a floating vessel, the belt comprises comprising:
   a belt body extending in a length direction, and including a sequence of bubble generators embedded in the belt body;
   an air channel for supplying pressurized air to the bubble generators, and extending in the length direction; and
   a tension cable configured to tension the belt around the hull of the floating vessel,
   wherein the bubble generators are connected to the air channel, and
   wherein the belt body is made of a flexible material.

2. The belt according to claim 1, wherein the air channel is fully enclosed in the belt body.

3. The belt according to claim 1, wherein the belt body is made of rubber or an elastic plastic.

4. The belt according to claim 1, wherein the tensioning cable is fully embedded in the belt body.

5. The belt according to claim 1, wherein the tensioning cable is made of steel and/or aramid fibers and/or polypropylene fibers.

6. The belt according to claim 1, further comprising:
   magnets embedded in the belt body, and for attaching the belt to a metallic hull of the floating vessel.

7. The belt according to claim 1, wherein the bubble generators are fluidic oscillators for generating one or more pulsating air flows from a constant air flow.

8. A device for reducing the drag of the hull of the floating vessel, wherein the device comprises the belt according to claim 1, and a tensioning device for tensioning the belt partly or completely around the hull of a floating vessel.

9. The device according to claim 8, further comprising:
   a tension monitoring system capable of generating a status signal indicating a tension status signal indicating a tension which is outside a desired range.

10. The device according to claim 8, further comprising:
    a source of pressurized air connected to the air channel.

11. The device according to claim 8, wherein the tension monitoring system is connected to a source of pressurized air, and whereby the device is arranged such that an occurrence of said status signal causes the source of pressurized air to cease provision of pressurized air.

12. A method of reducing the drag of the hull of the floating vessel using the belt according to claim 1, whereby the belt is installed under the hull, whereby pressurized air is supplied to the air channel.

13. The method according to claim 12, further comprising:
    magnets embedded in the belt body, and for attaching the belt to a metallic hull of the floating vessel,
    wherein the belt, in a non-tensioned state, is first attached to the hull by the magnets, and afterwards the belt is tensioned against the hull, and during use of the belt tension is maintained.

14. The method according to claim 12, whereby the vessel is a vessel which is being towed by another vessel.

15. The belt according to claim 1, wherein the tension cable is located between the air channel and the bubble generators.

16. The belt according to claim 1, wherein a maximum length of the air channel is greater than a maximum length of each of the bubble generators.

17. The belt according to claim 1, further comprising:
    a plurality of magnets,
    wherein the bubble generators are overlapped by a magnet of the plurality of magnets and the air channel is not overlapped by a magnet of the plurality of magnets.

* * * * *